United States Patent
Kalkunte

(10) Patent No.: US 10,212,087 B2
(45) Date of Patent: Feb. 19, 2019

(54) MESH NETWORK ASSESSMENT AND TRANSMISSION

(71) Applicant: Vivint, Inc., Provo, UT (US)

(72) Inventor: Venkat Kalkunte, Saratoga, CA (US)

(73) Assignee: Vivint, Inc., Provo, UT (US)

( * ) Notice: Subject to any disclaimer, the term of this patent is extended or adjusted under 35 U.S.C. 154(b) by 326 days.

(21) Appl. No.: 14/489,174

(22) Filed: Sep. 17, 2014

(65) Prior Publication Data

US 2016/0080966 A1    Mar. 17, 2016

(51) Int. Cl.
*H04L 12/803*  (2013.01)
*H04W 40/08*  (2009.01)
*H04L 12/707*  (2013.01)

(52) U.S. Cl.
CPC ............ *H04L 47/125* (2013.01); *H04L 45/24* (2013.01); *H04W 40/08* (2013.01)

(58) Field of Classification Search
None
See application file for complete search history.

(56) References Cited

U.S. PATENT DOCUMENTS

| | | | | |
|---|---|---|---|---|
| 8,848,728 | B1 * | 9/2014 | Revah | H04L 47/50 370/386 |
| 2004/0190447 | A1 | 9/2004 | Dacosta | |
| 2005/0002421 | A1 * | 1/2005 | Ito | H04B 1/0483 370/474 |
| 2005/0129005 | A1 * | 6/2005 | Srikrishna | H04L 45/00 370/356 |
| 2006/0171346 | A1 | 8/2006 | Kolavennu et al. | |
| 2008/0095222 | A1 | 4/2008 | VanLaningham et al. | |
| 2009/0252145 | A1 * | 10/2009 | Meylan | H04L 47/14 370/348 |
| 2013/0136019 | A1 * | 5/2013 | Fujimoto | H04W 24/02 370/252 |
| 2014/0204759 | A1 | 7/2014 | Guo et al. | |
| 2014/0213191 | A1 * | 7/2014 | Courtice | H04W 40/12 455/67.11 |
| 2014/0219194 | A1 * | 8/2014 | Varoglu | H04W 76/043 370/329 |
| 2015/0047039 | A1 * | 2/2015 | O'Reirdan | H04L 63/1416 726/23 |
| 2015/0055488 | A1 * | 2/2015 | Chen | H04L 5/001 370/242 |

(Continued)

OTHER PUBLICATIONS

PCT International Search Report for International Application No. PCT/US2015/048027, dated Dec. 8, 2015 (4 pp.).

(Continued)

*Primary Examiner* — Chirag G Shah
*Assistant Examiner* — Amar Persaud
(74) *Attorney, Agent, or Firm* — Holland & Hart, LLP

(57) ABSTRACT

Systems, apparatuses, and methods relating to mesh network communications are described. In one embodiment a method may include receiving at least one information packet at a node, identifying one or more output communication links, assessing at least one characteristic of at least one of the one or more identified output communication links, and transmitting one or more information packets from a node via at least one of one or more identified output communication links based at least in part on at least one characteristic.

20 Claims, 10 Drawing Sheets

(56) References Cited

U.S. PATENT DOCUMENTS

2016/0007228 A1* 1/2016 Soriaga ............. H04W 28/0257
370/216
2016/0021596 A1* 1/2016 Hui ....................... H04W 40/04
370/329

OTHER PUBLICATIONS

Ca Va Phan et al., "Opportunistic Transmission for Wireless Sensor Networks Under Delay Constraints," Computational Science and Its Applications—ICCSA 2007, Aug. 26, 2007.
Partial Supplementary European Search Report for EP Application No. 15842564.5, dated Feb. 12, 2018 (18 pp.).

* cited by examiner

700

705 — Receiving at least one information packet at a node via an input communication link 710 — Identifying one or more output communication links linked to the node 715 — Assessing at least one characteristic of at least one of the one or more identified output communication links including comparing whether the at least one characteristic of the at least one of the one or more identified output communication links exceeds the at least one characteristic of another one of the one or more identified output communication links 720 — Assessing at least one characteristic of at least one of the one or more identified output communication links including referencing stored data 725 — Transmitting one or more information packets from the node via at least one of the one or more identified output communication links including transmitting one or more information packets from the node via two or more of the one or more identified output communication links

*FIG. 7*

MESH NETWORK ASSESSMENT AND TRANSMISSION

BACKGROUND

Because of constantly-changing wireless communication technology and new users creating new network points, systems have attempted to keep up with the increasing demand by using conventional communication networks. Known systems may communicate using different frequencies, but in many cases rely on an all-or-nothing operation—where if the link between nodes exists then transmission will occur and if no link exists or the link is too weak, then no transmission will occur. Another problem includes the quality of the transmission link, which conventional "all-or-nothing" systems do not account for. These systems merely receive and transmit without evaluating current and/or future performance.

In addition because of the all-or-nothing organization, current networks only attempt to keep up with dynamically changing networks. Often these attempts yield exponential increases in complexity with only minimal, if any, results. Networks are merely static and require significant downtime to reconfigure hundreds or thousands of devices and extensive management to prevent service disruption. Lastly, current networks may rely on network oversubscription to dictate network scaling. This overloading of network portions only provides a reactive notification to those monitoring the network and because of current dynamically changing networks these notifications are insufficient.

SUMMARY

According to at least one embodiment, a method for receiving and transmitting wireless communication information is disclosed. In some embodiments the method may include receiving at least one information packet at a node via an input communication link, identifying one or more output communication links linked to the node, assessing at least one characteristic of at least one of the one or more identified output communication links, and/or transmitting one or more information packets from the node via at least one of the one or more identified output communication links based at least in part on the at least one characteristic.

In some embodiments, assessing the at least one characteristic of at least one of the one or more identified output communication links may include determining a strength of a connection between the node and another node. In some embodiments assessing the at least one characteristic of at least one of the one or more identified output communication links may include comparing whether the at least one characteristic of the at least one of the one or more identified output communication links exceeds the at least one characteristic of another one of the one or more identified output communication links.

In some embodiments assessing the at least one characteristic of at least one of the one or more identified output communication links may include determining at least one of a signal to noise ratio and a strength of each of a plurality of connections between the node and at least one of the one or more identified output communication links. In some embodiments assessing the at least one characteristic of at least one of the one or more identified output communication links may include comparing a load factor of at least two of the one or more identified output communication links.

In some embodiments assessing the at least one characteristic of at least one of the one or more identified output communication links may include determining whether the at least one characteristic exceeds a predetermined value. In some embodiments assessing the at least one characteristic of at least one of the one or more identified output communication links may include referencing stored data.

In some embodiments the at least one set of stored data may include a transmission history related to at least one of the one or more identified output communication links. In some embodiments the one or more information packets may include the at least one information packet received at the node. In some embodiments transmitting one or more information packets from the node via at least one of the one or more identified output communication links may include transmitting one or more information packets from the node via two or more of the one or more identified output communication links.

In some embodiments assessing at least one characteristic of at least one of the one or more identified output communication links may include referencing stored data about the two or more of the one or more identified output communication links. In some embodiments transmitting one or more information packets from the node via the two or more of the one or more identified output communication links may be performed automatically based at least in part on assessing at least one characteristic of at least one of the one or more identified output communication links.

In some embodiments transmitting one or more information packets from the node via at least one of the one or more identified output communication links may include transmitting a first set of information packets to a third node via a first route and transmitting a second set of information packets to the third node via a second route.

In some embodiments transmitting one or more information packets from the node via at least one of the one or more identified output communication links may include transmitting a first set of information packets to a first node via a first route and transmitting a second set of information packets to a second node via a second route.

In some embodiments the first set of information packets and/or the second set of information packets may each include one or more information packets. In some embodiments at least a portion of the first set of information packets and the second set of information packets include corresponding, identical, and/or similar information.

According to at least one embodiment, an apparatus for wireless communication is described. In some embodiments an apparatus may include a node linked to one or more input communication links, the node linked to one or more output communication links, a processor, memory in electronic communication with the processor, and/or instructions stored in the memory, the instructions being executable by the processor to: receive at least one information packet at the node via the one or more input communication links linked to the node, identify one or more output communication links linked to the node, assess at least one characteristic of at least one of the one or more identified output communication links, and transmit one or more information packets from the node via at least one of the one or more identified output communication links based at least in part on the at least one characteristic.

In some embodiments the apparatus may include a data storage device and/or assessing the at least one characteristic of at least one of the one or more identified output communication links may include referencing stored data linked to the data storage device.

A non-transitory computer-readable storage medium storing computer executable instructions is also described. When the instructions are executed by a processor, the execution of the instructions may cause the processor to: receive at least one information packet at the node via the one or more input communication links linked to the node, identify one or more output communication links linked to the node, assess at least one characteristic of at least one of the one or more identified output communication links, and transmit one or more information packets from the node via at least one of the one or more identified output communication links based at least in part on the at least one characteristic. In some embodiments assessing the at least one characteristic of at least one of the one or more identified output communication links may include determining whether the at least one characteristic exceeds a predetermined value.

BRIEF DESCRIPTION OF THE DRAWINGS

The accompanying drawings illustrate a number of exemplary embodiments. These drawings are incorporated as part of the specification. Together with the following description, these drawings demonstrate and explain various principles of the instant disclosure. These drawings do not limit the disclosure in any way and should not be construed as such—only serving as exemplary embodiments.

FIGS. 6-9 depict block diagrams of exemplary systems and methods that may be performed in accordance with this disclosure.

Figure 1:
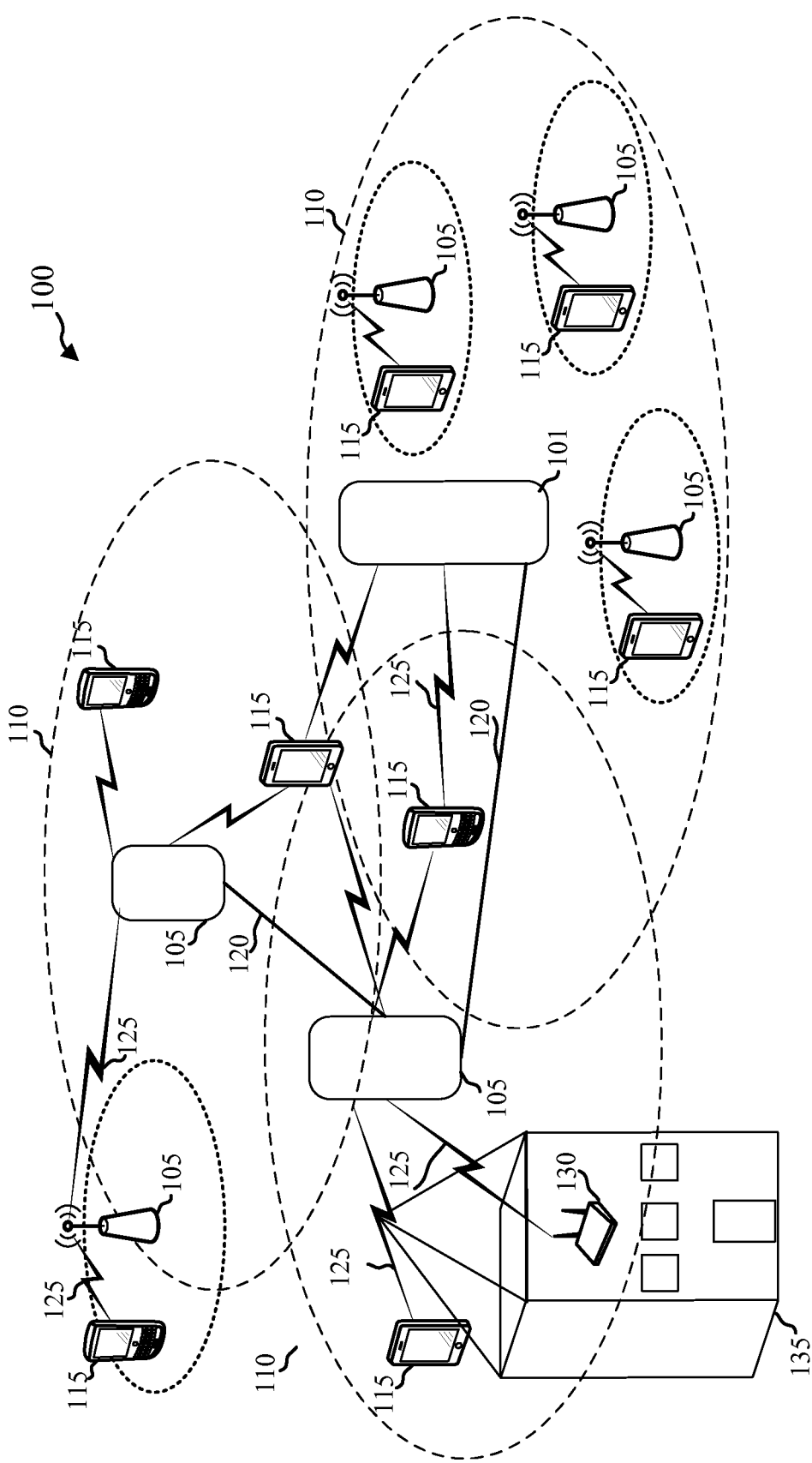
FIG. 1 is a block diagram of a wireless communications system of exemplary apparatus and methods of organization in which the present systems and methods may be implemented.

While the embodiments described here are susceptible to various modifications and alternative forms, specific embodiments have been shown merely by example in the drawings and are described in detail. The exemplary embodiments described, however, are not limited to the particular forms, details, structures, or other characteristics disclosed. Rather, this disclosure covers all modifications, equivalents, and alternatives falling within the scope of the appended claims.

DETAILED DESCRIPTION OF EXEMPLARY EMBODIMENTS

The systems, the apparatus, and the methods described here relate to wireless communication. More specifically, the systems, the apparatus, and the methods described here relate to one or more assessments of, in some cases, signal characteristics related to mesh networks and transmitting information based at least in part on these one or more assessments. Some embodiments include receiving certain information and/or characteristics, identifying certain information and/or characteristics, making assessments related to certain information and/or characteristics, and/or transmitting certain information and/or characteristics.

Any discussion of any apparatus, system, method, and/or any other characteristic discussed with respect to one element (e.g., system 200) is not limiting and applies to every other discussion of that same element (e.g., system 200), same element type (e.g., another system), or any other element type (e.g., a method).

FIG. 1 is a block representation illustrating one embodiment of a system 100 in which the present systems, apparatuses, and methods may be implemented. In some embodiments the systems and methods described here may be performed on or by one or more devices (e.g., system 100). As depicted, system 100 may include one or more assessment nodes 101, nodes 105, geographic areas 110, devices 115, a first set of communication links 120, a second set of communication links 125, routers 130, and/or structures 135. In some embodiments assessment nodes 101 may be nodes connected via a wireless mesh network. In some embodiments the assessment node 101 may receive information via one or more other assessment nodes and/or one or more nodes 105. In some embodiments assessment nodes 101 and nodes 105 may be interchangeable. In some embodiments every node in the wireless mesh network may be an assessment node 101. Examples of assessment node 101 may include, but are not limited to, a router, a switch, a gateway, a hub, a specially programmed processing unit, and/or other devices and/or programming. In other embodiments only some of the nodes in the wireless mesh network may be assessment nodes 101 and others may be nodes 105.

In some embodiments nodes 105 may be connected to one or more devices 115 via one or more wired or wireless communication links 125. In some embodiments geographic areas 110 may encompass multiple nodes 105, assessment nodes 101, devices 115, routers 130, and structures 135. In some embodiments some or all of the parts of the system shown in FIG. 1 may be connected using 2.4 GHz, 5 GHz, 60 GHz, and/or other types of connections. In some embodiments each node 105 may serve as a central node for a group of items, including devices 115, routers 130, structures 135, and other devices. In some embodiments node 105 may be connected via the second set of communication links 125 to one or more devices 115, structures 135, and/or routers 130. In some embodiments the second set of communication links 125 may include one or more 5 GHz connections. In some embodiments structures 135 may be a residential home, a business, or other device. In some embodiments structure 135 may contain a router 130, device 115, and/or other device.

As shown in FIG. 1 assessment node 101 may be linked to multiple devices and/or nodes 105. In some embodiments assessment node 101 may be connected to nodes 105 via the first set of communication links 120. The first set of communication links 120 may include any type of connection suitable for wired or wireless communication. In some embodiments one or more inks of the first set of communication links 120 may include one or more 5 GHz connections between one or more of nodes 105 and assessment node 101. This 5 GHz connection may provide distinct advantages over alternatives, including but not limited to 2.4 GHz and/or 60 GHz technology, as would be understood by a person of skill in the art and described in this disclosure (i.e., including signal strength, range, less interference, less congestion, etc.).

In some embodiments one or more of the first set of communication links 120 may include one or more 60 GHz connections between one or more of nodes 105 and assessment node 101. This 60 GHz connection may provide distinct advantages over alternatives, including but not limited to 2.4 GHz and/or 5 GHz technology, as would be understood by a person of skill in the art and described in this disclosure (i.e., reusing certain signals, increased transmission speed, wider frequency spectrum, etc.). In some cases, higher frequency technology may rely on line of sight transmission-allowing multiple 60 GHz radios or receivers to be installed nearby without heavy interference. Because of this, co-located radios or receivers operating in similar or the same frequencies can easily be isolated from each other based on small lateral or angular changes.

In some embodiments the first set of communication links 120 may include one or more 60 GHz connections between one or more of nodes 105 and assessment node 101 and a 5 GHz connection between one or more of nodes 105 and assessment node 101.

In some embodiments the one or more of nodes 105 and assessment node 101 may include one or more connections, including different types of connections. In some embodiments the multiple connection between one or more of nodes 105 and assessment node 101 may include both a 60 GHz connection and a 5 GHz connection. In some embodiments a network comprised of one or more of nodes 105 and one or more assessment nodes 101 may include overlapping multiple connections of 5 GHz and overlapping multiple connections of 60 GHz.

In some embodiments the first set of communication links 120 may include one or more 5 GHz connection between one or more of nodes 105, a 5 GHz connection between a node 105 and an assessment node 101, a 60 GHz connection between a node 105 and an assessment node 101, and/or a 60 GHz connection between one or more assessment nodes 101. Thus, in some embodiments groups of devices (i.e., devices 115, routers 130, and/or structures 135) may communicate with a local node via a 5 GHz communication link 125 connection. These groups of devices may then be connected to each other via a 60 GHz communication link 120. In some embodiments the first set of communication links 120 and the second set of communication links 125 may have different properties and/or employ different connection types (i.e., 2.4 GHz, 5 GHz, 60 GHz, etc.), while in other embodiments they may employ similar or the same connection types.

In some embodiments the system 100 may include one or more nodes 105 as base stations (or cells), communication devices 115, and/or a network. The nodes 105 may communicate with the communication devices 115 under the control of a controller, which may be part of a network or one or more nodes, such as nodes 105, in various embodiments. Nodes 105 may communicate control information and/or user data with the network through communication links 125 and/or communication links 120. The system 100 may support operation on multiple waveform signals of different frequencies.

The nodes 105 may wirelessly communicate with the devices 115 via one or more antennas. Each of the nodes 105 may provide communication coverage for a respective geographic area 110. In some embodiments, nodes 105 may be referred to as a base transceiver station, a radio base station, an access point, a radio transceiver, or some other suitable terminology. The geographic area 110 for a base station may be divided into sectors making up only a portion of the coverage area.

The second set of communication links 125 shown in system 100 may include one or more uplink transmissions from a mobile device 115 to a node, such as node 105 or an assessment node 101, and/or downlink transmissions from a node 105 or an assessment node 101 to a mobile device 115. The downlink transmissions may also be called forward link transmissions while the uplink transmissions may also be called reverse link transmissions. While the system 100 is described in relation to specific components and architecture, those skilled in the art will readily appreciate the various concepts presented throughout this disclosure may be extended to various types of mesh network systems.

According to this disclosure any discussion, description, feature, and/or characteristic described with respect to any node, including an assessment node, may equally apply to any other nodes discussed here.

Figure 2:
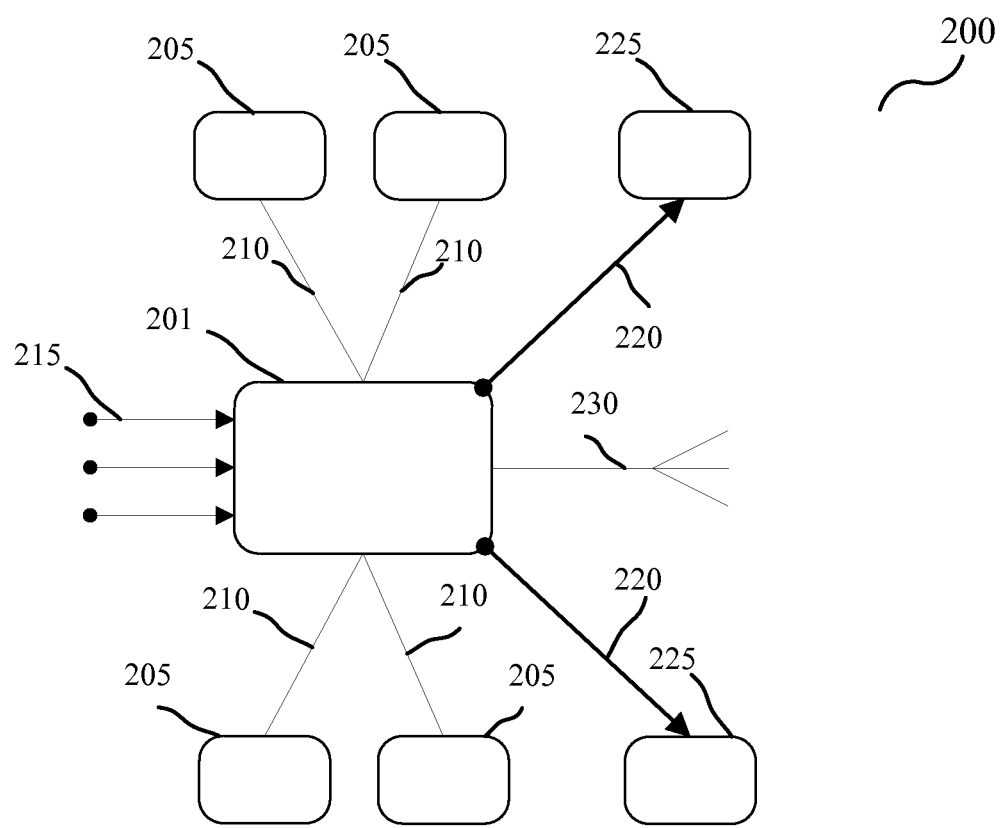
FIG. 2 is a block representation of an exemplary system including apparatus and methods in which the present systems and methods may be implemented.

FIG. 2 shows an exemplary system 200 in accordance with some embodiments. This system 200 may include one or more assessment nodes 201, nodes 205, communication links 210, input communication links 215, output communication links 220 and 230, intermediate nodes 225, and/or other components.

In some embodiments assessment node 201 may receive information via one or more input communication links 215. These input communication links 215 may transmit information from other nodes and/or devices via wired or wireless communication links. In some embodiments input communication links 215 may all be the same type, while in other embodiments assessment node 201 may receive information through multiple nodes of different types. For example, in some embodiments assessment node 201 may receive information through an input communication link 215 operating at 2.4 GHz with its associated properties, an input communication link 215 operating at 5 GHz with its associated properties, and/or an input communication link 215 operating at 60 GHz with its associated properties. In some embodiments assessment node 201 may provide distinct advantages by leveraging the advantages of 60 GHz technology and 5 GHz technology together.

In some embodiments assessment node 201 may be connected to one or more other nodes 205 via communication links 210. These communication links 210 may allow transmission and/or reception of information between nodes 205 and assessment node 201. Communication links 210 may permit unidirectional and/or bidirectional communication between nodes 205 and assessment nodes 201.

In some embodiments assessment node 201 may be able to identify one or more output communication links 220. Output communication links 220 may permit unidirectional and/or bidirectional communication between intermediate nodes 225 and assessment nodes 201.

Assessment node 201 may be able to identify one or more output communication links 220 in multiple ways. In some embodiments assessment node 201 may detect output communication links 220 by identifying the existence of hardware, a connection for sending and/or receiving signals, based on software programming, and/or through other methods known by one of ordinary skill in the art.

Assessment node 201 may be able to perform an assessment of the one or more output communication links 220. In some embodiments this assessment may include assessing one or more characteristics of one or more output communication links 220. In other instances, this assessment may include assessing one or more characteristics of only one output communication link 220.

In some embodiments, this assessment may include assessing one or more characteristics of multiple output communication links 220 and comparing these one or more characteristics with each other. This comparison may include determining whether one or more characteristics are equal, similar, less than, greater than, within a range of each other, and/or other quantitative and/or qualitative based comparisons.

In some embodiments this assessment may include determining whether the at least one characteristic exceeds a predetermined value. For example, one characteristic may include determining the uplink and/or the downlink speed of an output communications link 220. By determining whether the uplink and/or downlink speed exceeds a certain value, the assessment node may determine whether to transmit information over this output communications link 220 at this time or not. In some embodiments the assessment node 201 may determine whether the at least one characteristic exceeds a predetermined value once, twice, at regular intervals, based on changes to one or more network elements, and/or based on receiving other information related to other system devices and performance (such as the availability and/or characteristics of other output communication links 220).

In some embodiments, this assessment may include determining a strength of signal connection between the assessment node 201 and another node, such as an intermediate node 225. This assessment may be performed based on historical performance of one or more output communication links 220 and/or other nodes, such as nodes 205 or intermediate nodes 225. In some embodiments this assessment includes transmitting certain information and monitoring the strength of the signal dynamically while transmitting the certain information. In some embodiments this assessment may include using a software determination to determine the strength of one or more output communication links 220.

In some embodiments this assessment may include determining at least one of a signal to noise ratio (SNR) and a strength of each of a plurality of connections between the node and at least one of the one or more identified output communication links. In some embodiments this SNR may be determined by comparing the level of a desired signal to the level of background noise. This SNR may be examined as the ratio of signal power to the noise power and may be expressed in decibels. In some embodiments, a ratio higher than 1:1 (greater than 0 dB) may indicate more signal than noise. This assessment related to the SNR may determine whether the ratio is above a certain predetermined threshold (e.g., 1:1, 1.25:1, 1.5:1, 2:1, 5:1, 10:1, etc. . . . ).

In some embodiments this assessment may include comparing a load factor of at least two of the one or more identified output communication links 220. In some embodiments this comparison may include referencing historical data associated with one or more output communication links 220, such as the amount of transmission traffic, reliability, oversubscribing of one or more various types of nodes and/or communication links, and/or other factors. In some embodiments, this comparison may include referencing data captured recently. For example, it may include referencing stored data from transmissions within a certain time period (e.g., a past minute, hour, day, week, etc.). This load factor may include measuring the rate of information through one or more output communication links 220, nodes 205, other assessment nodes 201, and/or intermediate nodes 225.

In some embodiments the one or more assessments performed by assessment node 201 may reference stored data. This stored data may be stored locally at the assessment node 201, at another node (such as node 205 and/or intermediate node 225), and/or over a network to which a node is connected. This stored data may include a transmission history related to one or more output communication links 220, nodes 205, intermediate nodes 225, and/or other data related to the assessment node 201 itself.

For example, the assessment node 201 may be able to reference stored data including a reachability factor. This reachability factor may, through quantitative and/or qualitative means track whether information packets have been sent over a certain output communication link connection over a certain time period, with a certain frequency, with a certain speed, and/or with a certain SNR value. This reachability factor may also include other characteristics relating to output communication links 220, nodes 205, intermediate nodes 225, and/or other data related to the assessment node 201 itself.

In some embodiments the stored data itself may be compared using various functions. For example, an assessment using an "exclusive or function" (XOR) may determine whether one or more sets of data are similar or different. Additional other functions that would be understood by those of ordinary skill in the art are also contemplated.

Assessments associated with any assessment node, including assessment node 201, may be performed by software to determine certain characteristics, hardware to determine whether certain characteristics or other hardware exists, by a combination of these, and/or by other methods.

In some embodiments assessment node 201 may transmit information via one or more output communication links 220. These output communication links 220 may transmit information to other nodes and/or devices via wired or wireless communication links. In some embodiments output communication links 220 may all be the same type, while in other embodiments assessment node 201 may transmit information through multiple output communication links 220 of different types to nodes of the same or different types. For example, in some embodiments assessment node 201 may transmit information through an output communication link 220 operating at 2.4 GHz with its associated properties, an output communication link 220 operating at 5 GHz with its associated properties, and/or an output communication link 220 operating at 60 GHz with its associated properties.

In some embodiments transmitting one or more information packets from the assessment node 201 via at least one of the one or more identified output communication links 220 may include transmitting one or more information packets from the assessment node 201 via two or more of the one or more identified output communication links 220. In some embodiments based on or more assessments (which may be performed simultaneously, serially, and/or in parallel) the assessment node 201 may permit transmission of certain information packets over one or more output communication links. In some embodiments this transmission may include transmitting information simultaneously over different output communication links 220. In other embodiments this transmission may include transmitting information serially over different output communication links 220 (over a first link, then a second link, etc. . . . ).

In other embodiments this transmission may include transmitting information in parallel over different output communication links 220, with the different transmission not beginning and/or concluding at the same time.

In some embodiments this transmission from the assessment node 201 over one or more output communication links 220 may be performed automatically. In some embodiments this automatic transmission may occur based on other methods steps, including but not limited to one or more assessments. For example, if it is determined that one or more output communication links 220 is performing above a predetermined threshold value, then assessment node 201 may automatically transmit information via the one or more output communication links 220. In some embodiments this automatic transmission may occur for a certain period of time, a certain amount of data transfer, until a predetermined threshold value changes, based on one or more notification received by the assessment node 201 or another system component, and/or other events and/or characteristics.

In some embodiments assessment node 201 may transmit information over one or more output communication links 230, which may branch out and carry the same, similar, or even different information to one or more other nodes (i.e., assessment node 201, node 205, intermediate node 225, and/or other nodes).

Figure 3:
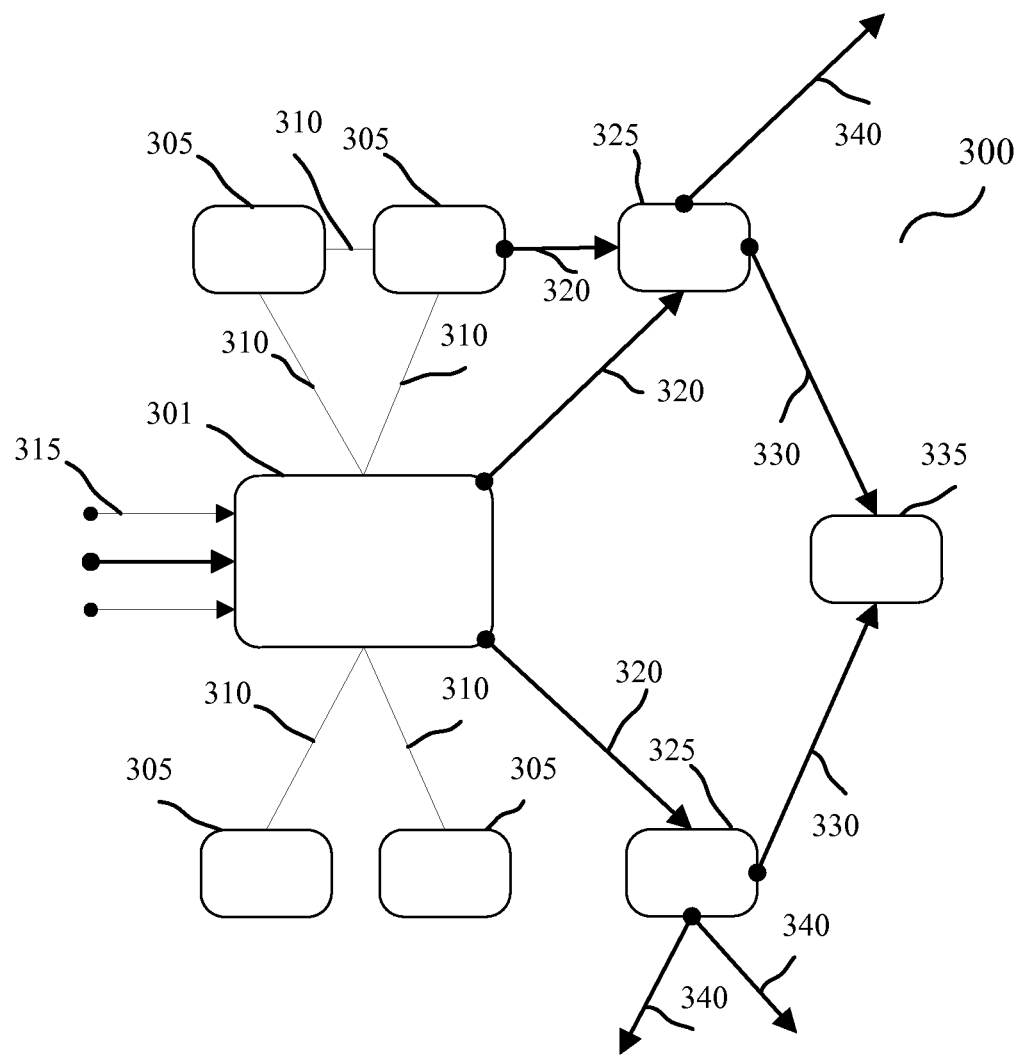
FIG. 3 is a block representation of an exemplary system including apparatus and methods in which the present systems and methods may be implemented.

FIG. 3 shows an exemplary system 300 in accordance with some embodiments. System 300 may include one or more assessment nodes 301, nodes 305, communication links 310, input communication links 315, a first set of output communication links 320, intermediate nodes 325, a second set of output communication links 330, secondary nodes 335, a third set of output communication links 340, and/or other components.

In some embodiments system 300 may incorporate some, most, all, or some other portion of similar characteristics as other systems discussed in this disclosure, including system 200 discussed above.

In some embodiments system 300 may incorporate other secondary nodes 335 and output communication links 330 and/or 340. These secondary nodes 335 may include similar capabilities and characteristics as assessment node 201, nodes 205, intermediate nodes 225, and/or other nodes discussed in this disclosure. For example, in some embodiments secondary node 335 may include similar properties as assessment node 201. This potentially allows multiple assessment nodes to provide varying levels of dynamic routing and information based on one or more assessments.

In some embodiments one or more assessments may include those performed at one or more nodes. For example, assessment node 301 may perform one or more assessments, transmit information to secondary node 335—acting as an assessment node—and then secondary node 335 may transmit information based on its own one or more assessments and/or based on the assessments performed at assessment node 301.

In some embodiments assessments performed at assessment node 301 may permit certain information to be transmitted from assessment node 301 via first set of output communication links 320 to intermediate node 325 and then via second set of output communication links 330 to secondary node 335. In some embodiments assessments performed at assessment node 301 may dictate that certain information is transmitted from assessment node 301 via multiple first set of output communication links 320 (along multiple routes) to multiple intermediate nodes 325 and then via multiple second set of output communication links 330 (along multiple routes) to one secondary node 335. Or this transmission may be sent via multiple output communication links 330 to two or more secondary nodes 335.

In some embodiments the transmission of information packets along multiple routes may be based on one or more assessments performed by one or more nodes (e.g., assessment node 301, etc.). In some embodiments, at least in part based on one or more assessments, information initially in one group may be separated into smaller, discrete groups and then transmitted separately along different routes at the same or different times, along the same routes at the same time, along the same routes at different times, or some combination. In this scenario a first portion of the information may be sent along a first route via a first output communication link 320 to a first intermediate node 325 and then along another output communication link 330 to a secondary node 335. At the same time, nearly the same time, serially, or in parallel, a second portion of the information may be sent along a second route via a second output communication link 320 to a second intermediate node 325 and then along another output communication link 330 to a secondary node 335.

In some embodiments the transmission of information packets along one or more routes may be based one or more assessments performed by one or more nodes (e.g., assessment node 301, etc.). In some embodiments based on an assessment (by hardware and/or software) by a node—such as assessment node 301—then the system may determine whether to utilize one or more different connections. In some embodiments this assessment may determine a path using only 5 GHz connections, only 60 GHz connection, a combination of 5 GHz and 60 GHz connections, and/or other connections. In some embodiments determining the connections to be used will dynamically change as the network changes. Conventional systems cannot and do not dynamically adjust or communicate between 5 GHz connections. In some embodiments, using assessment nodes 301, the system or methods may be self-arranging.

Intermediate nodes 325 may also serve as assessments nodes. In some embodiments, assessment node 301, intermediate node 325, and/or secondary node 335 may all serve as assessment nodes. This will allow for continuous branching and decision making about transmitting certain information packets across the mesh network to provide an efficient, effective network that may be able to dynamically change based on multiple factors including, but not limited to, new connection points, load factors, SNR, strength, availability, interference, and/or other factors related to one or more nodes.

In some embodiments the disclosed systems and methods may include combining lower frequency communication links with higher frequency communication links. For example, as described below, in some cases the network may consist of one or more nodes connected via one or more communication links to an enhanced node. These nodes may be connected to the enhanced node by any connection, but in some cases this may be a 5 GHz connection. Then the enhanced nodes may be connected to one or more other nodes via higher frequency connections, which may include one or more 60 GHz communication links. The enhanced nodes may be connected via 60 GHz communication links. By combining 5 GHz and 60 GHz communication links in the mesh network with an enhanced node organization, the network will include distinct advantages. In some embodiments the enhanced nodes may be assessment nodes.

In some embodiments nodes 305 may be connected by one or more output communication links 310. These output communication links 310 may include high frequency capabilities, low frequency capabilities, and/or both. In some embodiments output communication links 310 may include using 2.4 GHz, 5 GHz, and/or 60 GHz links. In some embodiments output communication links 310, 320, and/or 330 may include different link capabilities. These different link capabilities may include relative transmission parameters such as frequency. For example, one output communication link 310 may operate at a high frequency, while another output communication link 310 may operate at a low frequency. As another example, output communication link 310 may operate at a low frequency, while output communication link 320 and/or 330 may operate a high frequency.

Figure 4:
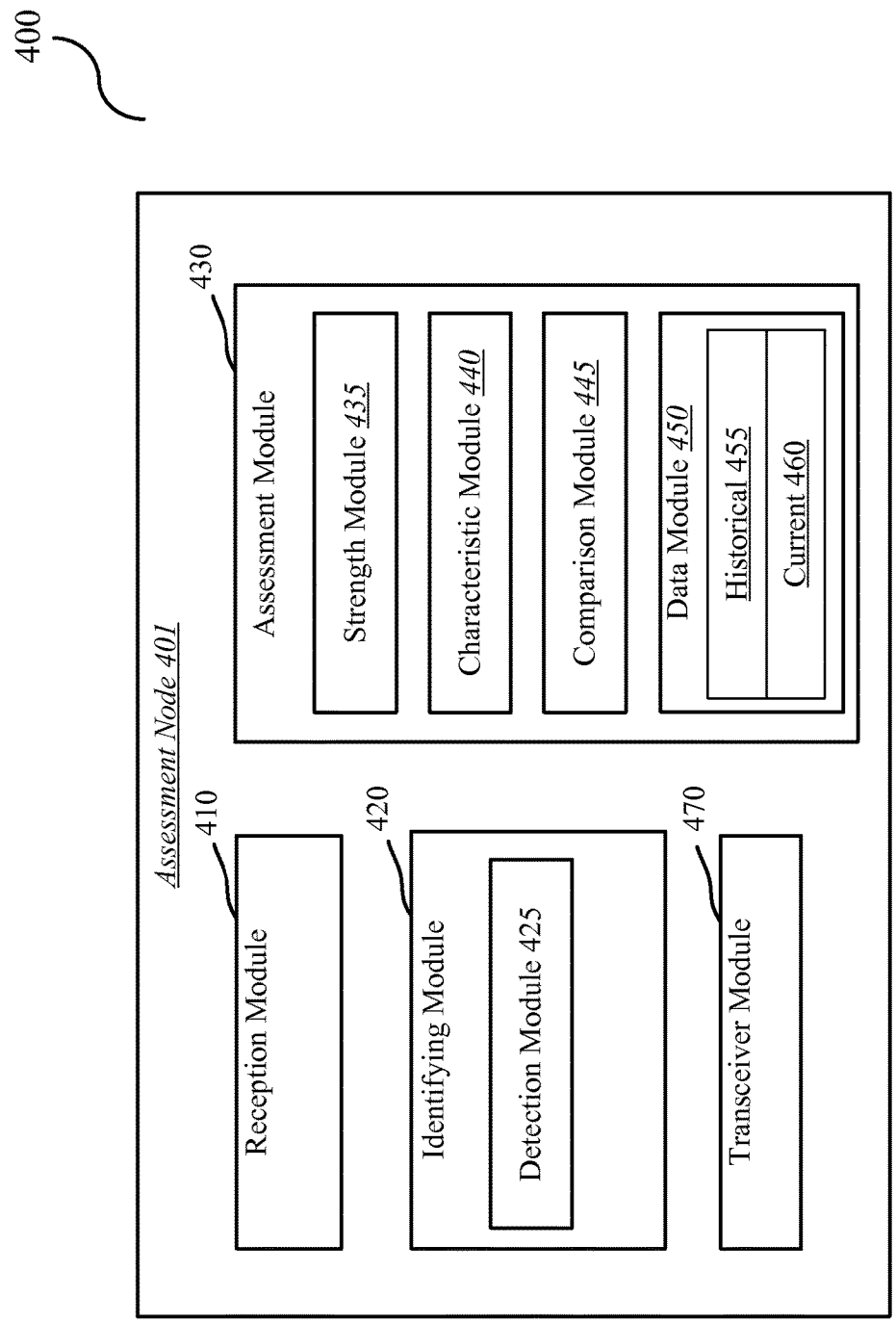
FIG. 4 is a block representation of exemplary systems and methods of organization in which the present systems and methods may be implemented.

FIG. 4 shows an exemplary system 400 in accordance with some embodiments. This system 400 may illustrate one embodiment of the components and/or organization of one or more assessment nodes 401. It should be noted that only some variations of the exemplary system 400 are shown and/or described and that a person of ordinary skill in the art having a basic understanding of some concepts will be able to implement the ideas disclosed here to perform the assessments and other functions disclosed. In some embodiments some, most, all, or any other combination of the elements shown in FIG. 4 may be related, connected, and/or in communication with each other.

In some embodiments assessment node 401 may include one or more: reception modules 410, identifying modules 420 with detection module 425, assessment modules 430, and/or transceiver modules 470. In some embodiments assessment module 430 may include one or more strength modules 435, characteristics modules 440, comparison modules 445, and/or data modules 450. In some embodiments strength module 435 may be able to (by executable instructions based on software and/or hardware components, and/or other methods) determine one or more strengths, or associated characteristics, SNR, etc. . . .

In some embodiments characteristic module 440 may be able to (by executable instructions based on software and/or hardware components, and/or other methods) determine one or more characteristics of the assessment node 401 itself, related other nodes, such as nodes 305, intermediate nodes 325, secondary nodes 335, input communication links 315, output communication links 310, 320, and/or 330, or other components related to an assessment node. Characteristics may include, but are not limited to, the type of node, the type of output communication link, bandwidth, overcrowding factors, load factors, historical use, current use, interference (including but not limited to co-channel interference (CCI), adjacent channel interference (ACI), and/or other interference), the presence of new nodes, links, or other related devices, network problems, etc. . . .

In some embodiments assessment node 401 may include a comparison module 445. This comparison module may be able to compare one or more elements related to strength module 435, characteristic module 440, data module 450, reception module 410, identifying module 420, transceiver module 470, and/or others.

Comparison module 445 may be able to compare one or more elements related to one or more different modules (e.g., strength module 435 and/or characteristic module 440) or may be able to compare one or more elements related to the one or more of the same modules (e.g., characteristic module 440).

For example, in some embodiments the comparison module may compare one or more characteristics of one or more output links, such as comparing one output communication link 320 with another output communication link 320. In some embodiments the comparison may compare a characteristic of an output link such as one output communication link 320 with intermediate node 325. In some embodiments this comparison module 445 may compare elements or characteristics related to one or more output communications links with one or more nodes—regardless of whether the one or more output communication links are related to the one or more nodes.

In some embodiments assessment node 401 may include data module 450. This data module 450 may include local memory for storing certain data or may communicate with remote memory. This data module 450 may include historical data 455 and/or current data 460, either of which may be stored locally or not. Data may include data determined in real-time, near real time, in a particular monitoring session or time period, or based on data received with one or more components related to the systems disclosed in this disclosure. In some embodiments current data may include recent past data. Data may include data recorded and stored from the past and in some cases may include data that has been grouped, organized, analyzed, and/or stored. This data may include but is not limited to data trends, usage information, qualitative information (whether a particular output communication link has been used during a certain time period [yes/no]), quantitative information (e.g., the number of time a particular output communication link has been used or a particular node has transmitted and/or received information). In other embodiments this data may include other types of data related to the system.

In some embodiments one or more components related to, included in, linked to, and/or otherwise connected to assessment node 401 may include a routing device. This routing device may, in some cases, advantageously provide additional capabilities. In some embodiments this router may allow for switching between one or more transmission routes. In some embodiments as part of an assessment or based on an assessment, a routing device may allow for communication along multiple output communication links. This multiple output communication link communication may occur serially, in parallel with overlapping transmission, and/or simultaneously. In some embodiments, as discussed in this disclosure, this routing device may allow for transmission of portions of a set of information over one output communication link and transmission of other portions of the set of information over another output communication. In some embodiments, using a routing device may allow for multiple active, simultaneous transmissions along one or more routes—that may be different and/the same— (including those of higher frequency, such as 60 GHz). This routing function may also be performed using software, hardware, and/or other programming.

In some embodiments using a routing device or routing programming may also help to regulate multiple subscribers attempting to transmit over the same spectrum and/or channel simultaneously or near-simultaneously. For example, nodes (such as nodes 305) may permit multiple users to attempt to transmit simultaneously over multiple output communication links 310 and potentially using the same output communication link 320. A routing device may allow for this simultaneous or near-simultaneous transmission by regulating data from multiple users.

In some embodiments one or more components of assessment node 401 may include, be related to, and/or be linked to a processing unit, which may include a processor, memory, and other elements. In some embodiments processing unit may be in electronic communication with one or more components within the processing unit and/or within an apparatus, including an assessment node 401. In some embodiments a processing unit may include a processor that can process one or more executable instructions stored in the memory. The memory may store computer executable instructions that when executed by the processor cause the processor to perform certain steps related to wireless communication access points. In some embodiments steps may include receiving certain information, identifying certain information, assessing certain information, and/or transmitting certain information. In some embodiments processing unit may be able to receive, identify, determine, assess, process, correlate, and/or adjust certain information related to an apparatus and/or a node.

Figure 5:
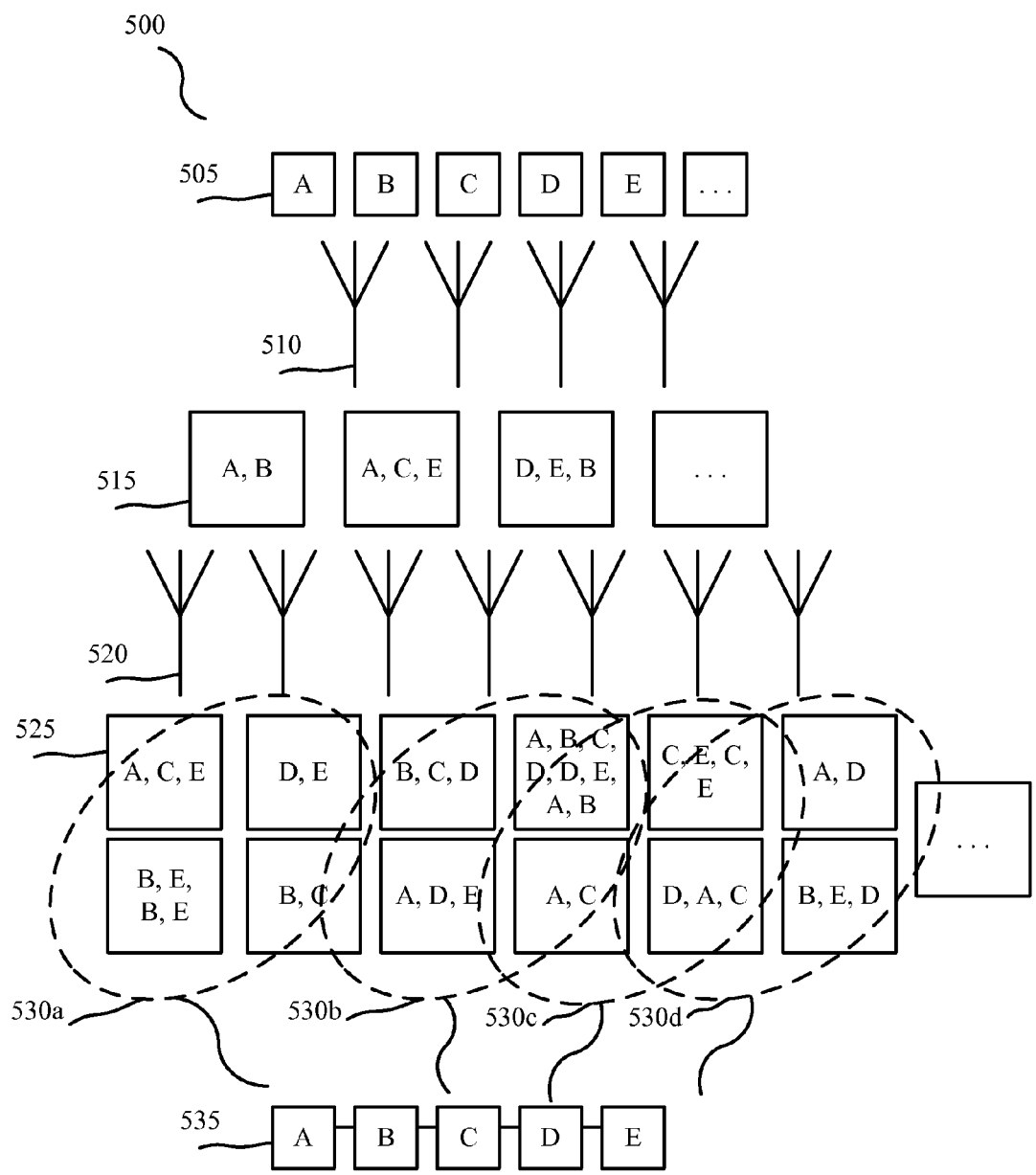
FIG. 5 is a block representation of an exemplary system including apparatus and methods in which the present systems and methods may be implemented.

FIG. 5 shows exemplary methods and system 500 in accordance with some embodiments. In some embodiments various networks related to the inventor's developments have multipath capabilities. These networks may provide a method to recover losses through co-operative network coding at one or more mesh network points and/or nodes. One or more encoded information packets may be a linear combination of multiple encoded data packets. In some embodiments the encoded data packet considers each distinct data packet as a binary number and assigns one or more variables to represent that number. Embodiments employing linear network coding may include providing coefficients in algebraic equations that create the associated linear combinations ($P_1=C_1X_1+C_2X_2+ \ldots ; \ldots ; P_N=C_{N1}X_{N1}+C_{N2}X_{N2}+ \ldots ;$). In some embodiments randomly generating each packet's encoding eliminates the need to independently track individual data packets. In some embodiments randomly generating linear combinations also means that packets can continue to be re-encoded without requiring decoding.

In some embodiments system 500 may initially have one or more distinct data packets 505 (e.g., A, B, C, D, E, etc. . . . ). Based on an event, system 500 may combine one or more of the data packets 505 by combining process 510. The result of this process in some cases may include various intermediate data packets 515. These intermediate data packets 515 may include one or more unique combinations of the data packets 505 (e.g., A-B, A-C-E, etc. . . . ). In some embodiments these intermediate data packets 515 may be assessed, transmitted, or have other operations performed on them. In some embodiments intermediate data packets 515 may be combined by combining process 520.

This combining process 520 may then yield numerous mixtures of secondary data packets 525, including various combinations of the initial, distinct data packets 505. As shown, these secondary data packets 525 may yield multiple, numerous combinations (e.g., 530a, 530b, 530c, 530d, etc. . . . ). The combinations yield numerous possible N mixtures of the data that may then include a combination 535 comprising at least the same data contained in the initial distinct data packets 505. If the number of combinations is sufficiently large, the probability that the receiving nodes will obtain linearly independent combinations (and thus obtain innovative information) approaches one.

The inventor's associated methods may be performed with respect to system 500. In some embodiments the system 500 may utilize the methods described in this disclosure to reassemble data that has been combined using one or more combining processes. In some embodiments one or more sets of data packets may be received at one or more assessment nodes. Based on one or more assessments a first portion of the one or more sets of data packets may be transmitted via a first path to a first node, while a second portion of the one or more sets of the data packets may be transmitted via a second path to a second node. In some embodiments the transmission of first and second portions of the one or more sets of the data packets may be transmitted via one or more paths to a third node. Thus, based on one or more assessments disclosed in this disclosure, different portions of one or more sets of data packets may be transmitted along different node paths.

In some embodiments multiple assessments may be performed and the portions of the set of the data packets may be expanded or contracted. For example at a first node the portion of the one or more sets of data packets may include N packets, then based on an assessment or other related operation, the portion of the set of data packets may include one or more different numbers of data packets (i.e., N−1, N−2, N+1, N+2, etc. . . . ). Certain smaller subsets of the portion of the one or more sets of data packets may then further change based on an additional assessment or other operation (i.e., N/2, N/3, N/4, etc. . . . )—such as further combining other data packets with the portion (as shown, for example only, in combining processes 510 and 520).

FIGS. 6-9 show exemplary methods that may be performed by or with the systems and apparatuses described in this disclosure. The inventor contemplates performing the steps shown in each figure in various orders, performing only some of the steps shown, and/or adding additional steps not presently shown in these only-exemplary figures. These steps may be performed the same as, similar to, or different from the ideas described in this disclosure. In some embodiments one or more variations of the methods described in each figure may be performed. In some embodiments steps or methods of one method (e.g., method 700) may be performed in conjunction with or in place of one or more steps or methods from another method (e.g., method 900).

Figure 6:
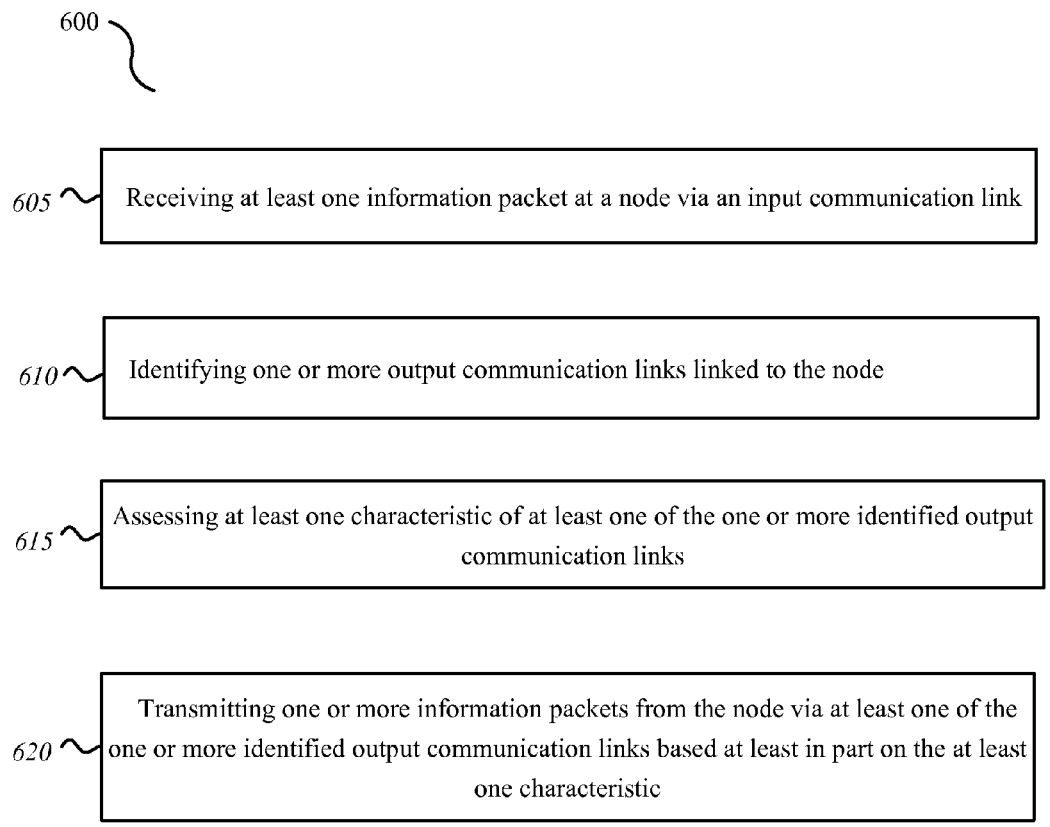

As shown in FIG. 6 with method 600, in some embodiments one or more nodes, including an assessment node, may receive at least one information packet via one or more input communication links as described in block 605. The one or more nodes may store this information for future use or may use this information to perform additional operations. In some embodiments an identification of one or more output communication links linked to the node may be performed, by an assessment node or otherwise, as shown in block 610. In some embodiments an assessment may be performed, by an assessment node or otherwise. In some embodiments this assessment may include assessing at least one characteristic of at least one of one or more identified output communication links as described in block 615. In some embodiments after, before, and/or during an assessment the method may include transmitting one or more information packets from the node via at least one of the one or more identified output communication links based at least in part on the at least one characteristic as shown in block 620.

As shown in FIG. 7 with method 700, in some embodiments one or more nodes, including an assessment node, may receive at least one information packet via one or more input communication links as described in block 705. The one or more nodes may store this information for future use or may use this information to perform additional operations. In some embodiments an identification of one or more output communication links linked to the node may be performed, by an assessment node or otherwise, as shown in block 710.

In some embodiments an assessment may be performed, by an assessment node or otherwise. In some embodiments this assessment may include one or more assessments. These one or more assessments may be performed serially, in parallel, and/or simultaneously. In some embodiments the assessment may include assessing at least one characteristic of at least one of the one or more identified output communication links including comparing whether the at least one characteristic of the at least one of the one or more identified output communication links exceeds the at least one characteristic of another one of the one or more identified output communication links as shown in block 715.

In some embodiments assessing at least one characteristic of at least one of the one or more identified output communication links may include referencing stored data as shown in block 720. And, in some embodiments based on one or more assessments, or independent of any assessment, a transmission may occur that transmits one or more information packets from the node via at least one of the one or more identified output communication links including comprises transmitting one or more information packets from the node via two or more of the one or more identified output communication links as shown in block 725.

In some embodiments a transmission may occur after a first assessment (e.g., as shown in block 715) but before as second assessment (e.g., as shown in block 720). In some embodiments a second assessment may be performed based on one or more changed characteristics of one or more output communication links, nodes, and/or other information.

Figure 8:
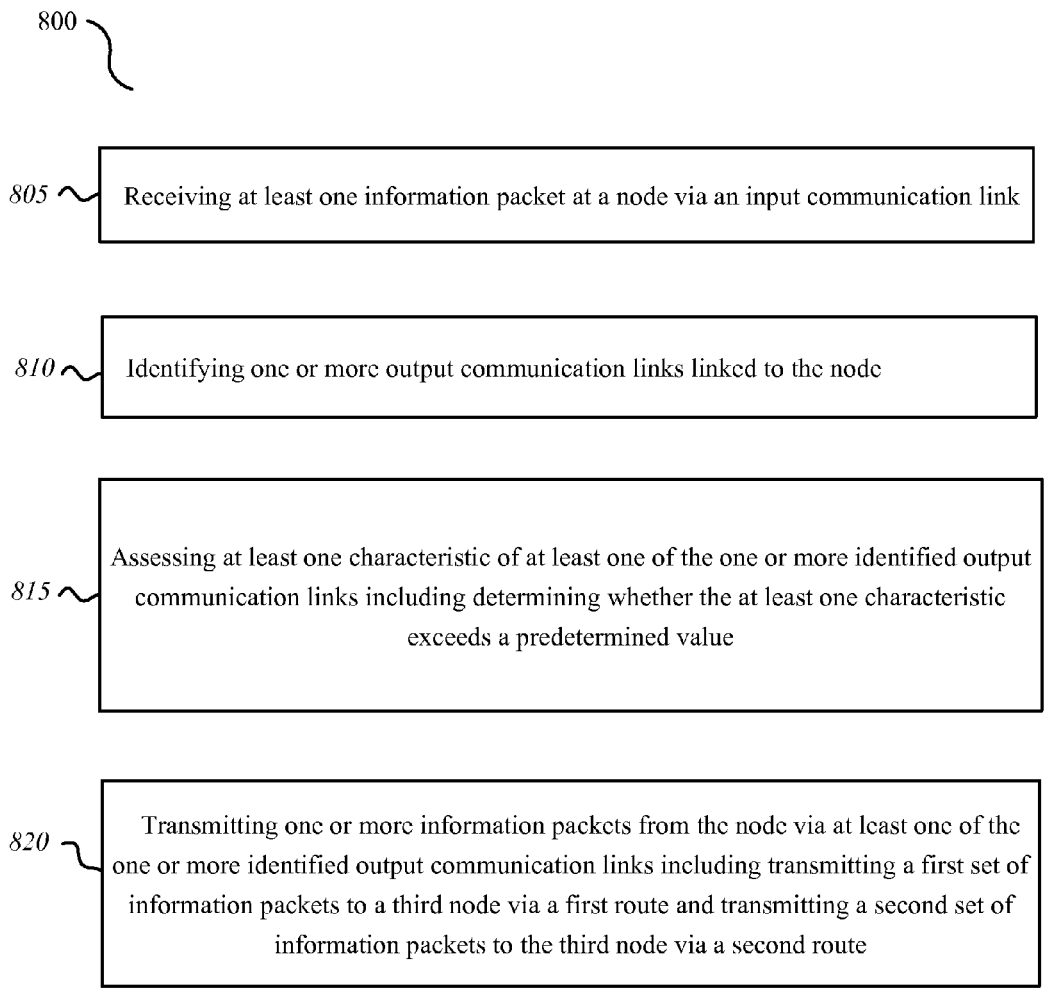

As shown in FIG. 8 with method 800, in some embodiments one or more nodes, including an assessment node, may receive at least one information packet via one or more input communication links as described in block 805. The one or more nodes may store this information for future use or may use this information to perform additional operations. In some embodiments an identification of one or more output communication links linked to the node may be performed, by an assessment node or otherwise, as shown in block 810.

In some embodiments an assessment may be performed, by an assessment node or otherwise. In some embodiments this assessment may include assessing at least one characteristic of at least one of the one or more identified output communication links including determining whether the at least one characteristic exceeds a predetermined value as described in block 815. In some embodiments after, before, and/or during an assessment the method may include transmitting one or more information packets from the node via at least one of the one or more identified output communication links including transmitting a first set of information packets to a third node via a first route and transmitting a second set of information packets to the third node via a second route as shown in block 820.

Figure 9:
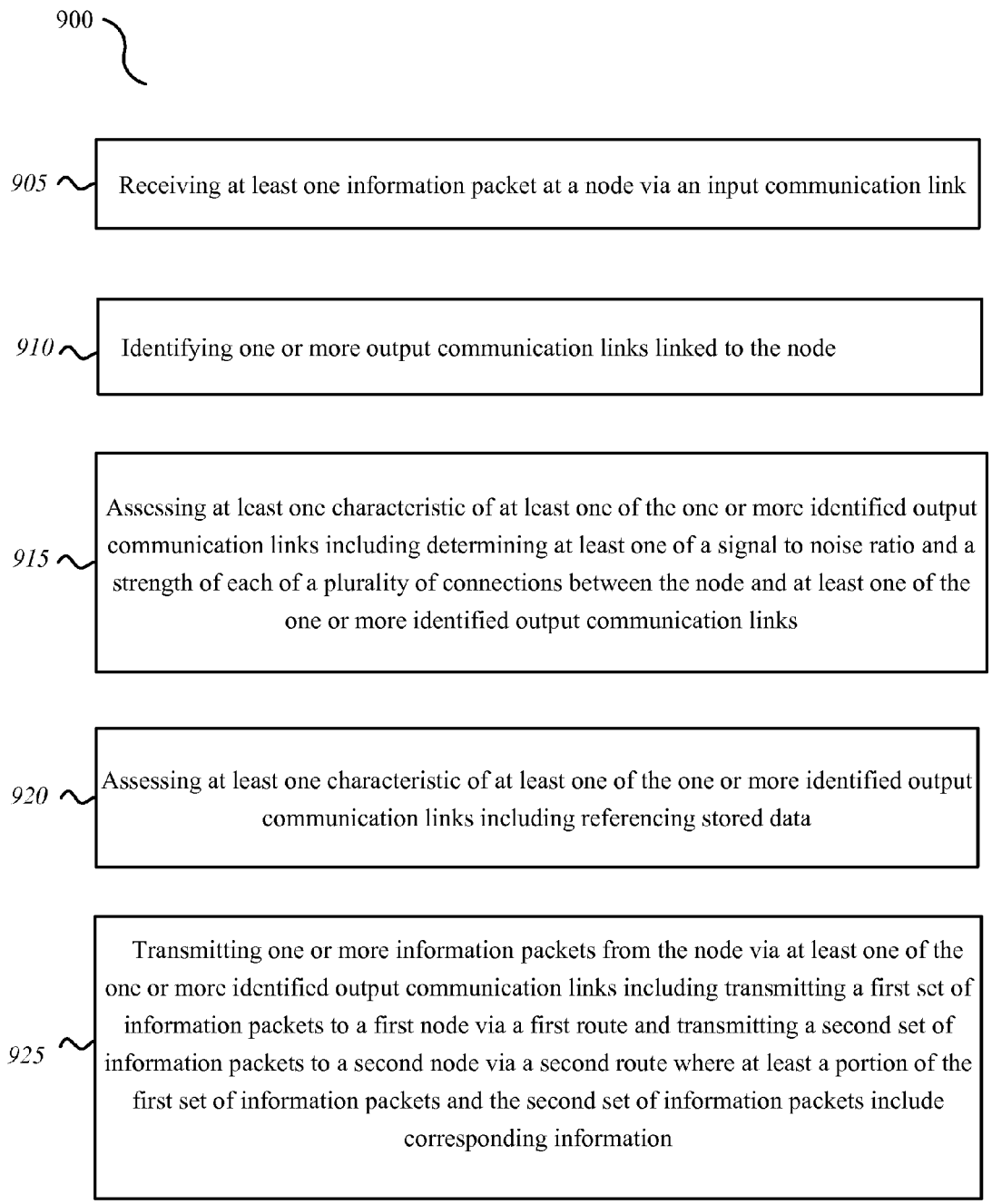

As shown in FIG. 9 with 900, in some embodiments one or more nodes, including an assessment node, may receive at least one information packet via one or more input communication links as described in block 905. The one or more nodes may store this information for future use or may use this information to perform additional operations. In some embodiments an identification of one or more output communication links linked to the node may be performed, by an assessment node or otherwise, as shown in block 910.

In some embodiments an assessment may be performed, by an assessment node or otherwise. In some embodiments an assessment may include assessing at least one characteristic of at least one of the one or more identified output communication links including determining at least one of a signal to noise ratio and a strength of each of a plurality of connections between the node and at least one of the one or more identified output communication links as described in block 915. In some embodiments an assessment may include assessing at least one characteristic of at least one of the one or more identified output communication links including referencing stored data as shown in block 920.

In some embodiments after, before, and/or during an assessment the method may include transmitting one or more information packets from the node via at least one of the one or more identified output communication links including transmitting a first set of information packets to a first node via a first route and transmitting a second set of information packets to a second node via a second route where at least a portion of the first set of information packets and the second set of information packets include corresponding information as shown in block 925.

In some embodiments one or more nodes may serve as or include one or more receivers, such as an antenna, to receive one or more signals. The signals received may include wireless communication signals such as radio frequency, electromagnetics, local area network (LAN), wide area network (WAN), virtual private network (VPN), wireless network (using 802.11, for example), cellular network (using 3G and/or LTE, for example), or other signals. These antennas may include or be related to, but are not limited to, WWAN (GSM, CDMA, and WCDMA), WLAN (including Bluetooth and Wi-Fi), WMAN (WiMAX), and WPAN (including UWB and RFID), antennas for mobile communications, antennas for Wireless Personal Area Network (WPAN) applications (including RFID and UWB). In some embodiments each antenna may receive signals or information specific to itself. In other embodiments each antenna may receive signals or information not exclusive to itself.

Figure 10:
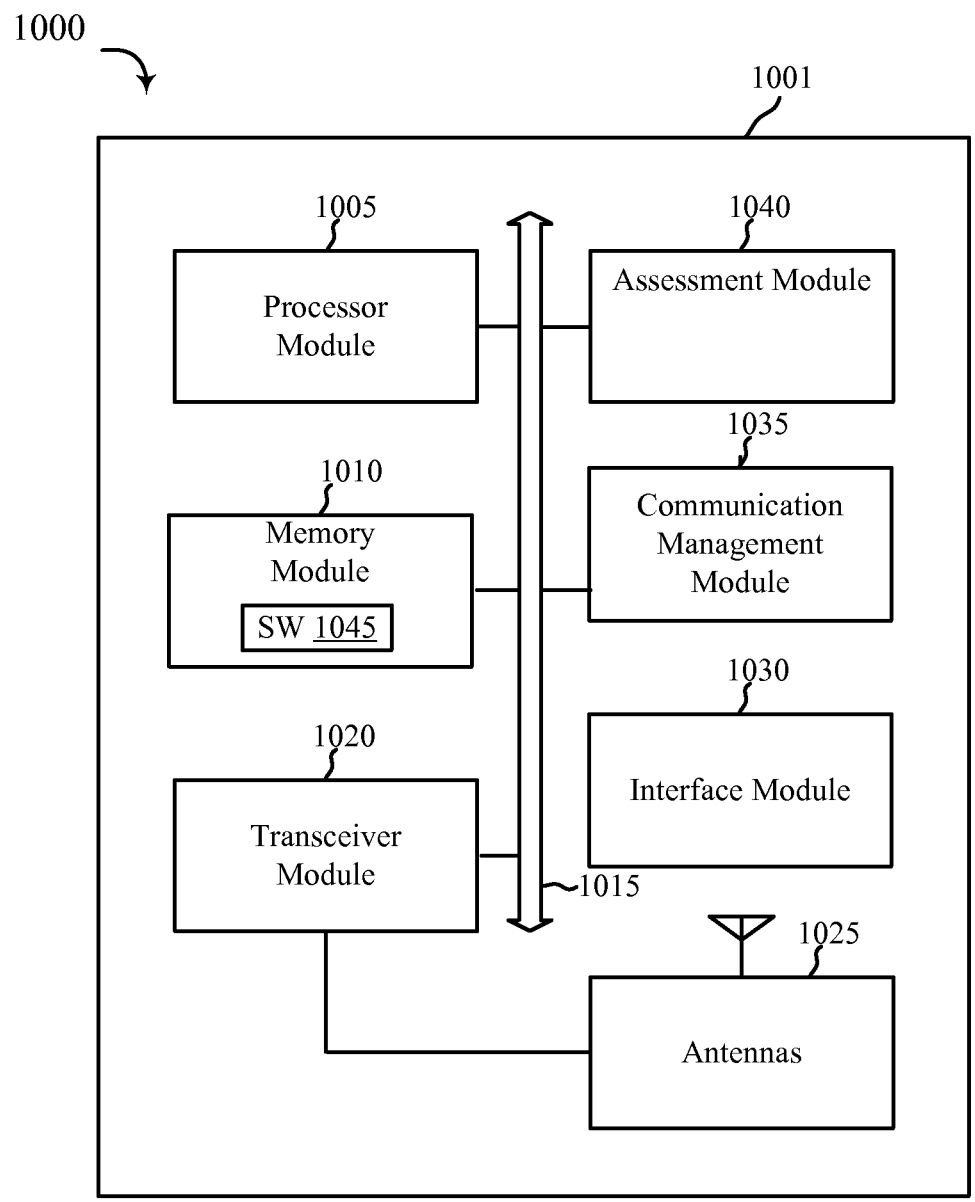
FIG. 10 is a block diagram illustrating one embodiment of an assessment node in accordance with the present disclosure.

As shown in FIG. 10, a diagram 1000 is shown that illustrates an exemplary assessment node 1001 to perform one or more assessments, other functions, and/or facilitate information transmission. Assessment node 1001 may have various other configurations and may be included in, connected to, or be part of a computer (e.g., laptop computer, netbook computer, tablet computer, etc. . . . ), a router, an internet appliance, etc. Assessment node 1001 may have an internal power supply, such as a small battery, to facilitate its operation or a direct connection to an external power supply. Assessment node 1001 may be an example of the other assessment nodes discussed in this disclosure relating to FIGS. 1-9, including but not limited to, assessment nodes 101, 201, 301, and/or 401; or it may be different.

Assessment node 1001 may include a processor module 1005, a memory module 1010, a bus 1015, a transceiver module 1020, one or more antennas 1025, an interface module 1030, a communication management module 1035, and/or an assessment module 1040. The assessment module 1040 may be an example of the assessment module 1040 to perform assessments discussed with respect to FIGS. 1-9. Each of these modules may be in communication with each other, directly or indirectly, over at least one bus 1015.

The memory module 1010 may include RAM and ROM. The memory module 1010 may store computer-readable, computer-executable software (SW) code 1045 containing instructions that are configured to, when executed, cause the processor module 1005 to perform various functions described here for assessing one or more characteristics related to one or more nodes and/or communication links, among other things. Alternatively, the software code 1045 may not be directly executable by the processor module 1005 but be configured to cause the assessment node (e.g., when compiled and executed) to perform functions described here.

The processor module 1005 may include an intelligent hardware device, e.g., a CPU, a microcontroller, an ASIC, etc. The processor module 1005 may process information received through the transceiver module 1020 and/or to be sent to the transceiver module 1020 for transmission through one or more antennas 1025. The processor module 1005 may handle, alone or in connection with the assessment module 1040, various aspects for assessing one or more characteristics related to one or more nodes and/or communication links, among other things.

The transceiver module 1020 may be configured to communicate bi-directionally with one or more access points and/or nodes discussed with respect to FIGS. 1-9. The transceiver module 1020 may be implemented as at least one separate transmitter module and at least one separate receiver module. The transceiver module 1020 may include a modem configured to modulate the packets and provide the modulated packets to one or more antennas 1025 for transmission and to demodulate packets received from one or more antennas 1025. While assessment node 1001 may include a single antenna, there may be embodiments in which the assessment node 1001 may include multiple antennas 1025.

The interface module 1030 may include a physical interface, which may include a local area connection that may use local area networking technology, and/or a logical interface, which may include for example a point-to-point connection, for directing information. The point-to-point connection may be based on either a physical connection or a logical connection and may also be either on-demand (where the point-to-point connection is only established when needed) or persistent (the point-to-point connection is established and then remains in a connected state).

According to the architecture of FIG. 10, the assessment node 1001 may further include a communication management module 1035. The communication management module 1035 may manage communications with various nodes. The communications management module 1035 may be a component of assessment node 1001 in communication with some or all of the other components of assessment node 1001 over the at least one bus 1015. Alternatively, functionality of the communication management module 1035 may be implemented as a component of the transceiver module 1020, as a computer program product, and/or as at least one controller element of the processor module 1005.

The components of assessment node 1001 may be configured to implement aspects discussed above with respect to FIGS. 1-9, and those aspects may not be repeated here for the sake of brevity.

In some embodiments, this disclosure may specifically apply to security system applications. In some embodiments, this disclosure may specifically apply to home or business automation system applications. For example, a new node is installed in a home in a neighborhood and that node may be connected to an assessment node via a 5 GHz link, the assessment node may alter a previous transmission instruction or may perform a new assessment based on the dynamically changing mesh network. Based on the dynamic change, this systems and the method described here allow for an assessment of the changed, updated system and appropriate modification of network communications over the nodes accordingly. Distinct advantages of such a system for these specific applications are apparent from this disclosure.

While this disclosure discusses various embodiments using specific block diagrams, flowcharts, and examples, each block diagram component, flowchart action, operation, and/or component described and/or illustrated may be implemented, individually and/or collectively, using a wide range of hardware, software, or firmware (or any combination thereof) configurations. In addition, any disclosure of components contained within other components or separate from other components should be considered exemplary because multiple other architectures may potentially be implemented to achieve the same functionality.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments these software modules may configure a computing system to perform one or more of the exemplary embodiments disclosed herein.

This description, for purpose of explanation, has been described with reference to specific embodiments. The illustrative discussions above, however, are not intended to be exhaustive or limit the invention to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least in part on."

What is claimed is:

1. A method for wireless communication in a mesh network, the method comprising:
   receiving, at a first node via an input communication link, a set of data packets to transmit to a second node and a third node in the mesh network;
   identifying, in response to the receiving, a plurality of output communication links linked to the first node;
   assessing a characteristic of each output communication link of the identified plurality of output communication links;
   determining that the characteristic associated with a portion of the identified output communication links between the first node and the second node and between the first node and the third node satisfies a predetermined threshold value;

identifying a transmission path for transmission of the set of data packets based at least in part on the determining, the identified transmission path comprising a first route to the second node and a second route to the third node, wherein the first route includes a first type of connection operating on a first frequency and the second route includes a second type of connection operating on a second frequency;

transmitting the set of data packets over the identified transmission path;

detecting a change in the mesh network;

adjusting the first frequency of the first type of connection based at least in part on the detected change in the mesh network;

determining that the characteristic associated with the first type of connection operating on the adjusted first frequency satisfies the predetermined threshold value; and simultaneously transmitting a first subset of the set of data packets from the first node to the second node over the first route and a second subset of the set of data packets from the first node to the third node over the second route, wherein the first route includes the first type of connection operating on the adjusted first frequency, wherein the second type of connection is different from the first type of connection and the second frequency is different from the adjusted first frequency.

2. The method of claim 1, wherein assessing the characteristic of the identified output communication links comprises determining a strength of a first connection between the first node and the second node and a strength of a second connection between the first node and the third node.

3. The method of claim 1, wherein assessing the characteristic of the identified output communication links comprises comparing whether the characteristic associated with each of the identified output communication link of the plurality of identified output communication links exceeds at least one characteristic of another identified output communication link.

4. The method of claim 1, wherein assessing the characteristic of the identified output communication links comprises determining at least one of a signal to noise ratio and a strength of each of a plurality of connections between the first node and each of the identified output communication links.

5. The method of claim 1, wherein assessing the characteristic of the identified output communication links comprises comparing a load factor of at least two of the identified output communication links.

6. The method of claim 1, wherein assessing the characteristic of the identified output communication links comprises determining whether the characteristic of each of the identified output communication links exceeds the predetermined threshold value.

7. The method of claim 1, wherein assessing the characteristic of the identified output communication links comprises referencing a set of stored data.

8. The method of claim 7, wherein the set of stored data comprises a transmission history related to the plurality of identified output communication links.

9. The method of claim 1, wherein the first route is between the first node and a third node, and the second route is between the third node and the second node.

10. The method of claim 1, wherein the first type of connection is associated with one identified output communication link of the plurality of identified communication links and the second type of connection is associated with a second identified output communication link of the identified plurality of output communication links.

11. The method of claim 10, wherein assessing the characteristic of the identified output communication links comprises referencing stored data about the one output communication link and the second identified output communication link of the identified plurality of output communication links.

12. The method of claim 10, further comprising:
transmitting the first subset of the set of data packets or the second subset of the set of data packets, or both, from the first node, is performed automatically based at least in part on assessing the characteristic of at least the one identified output communication link and the second identified output communication link.

13. The method of claim 1, further comprising:
transmitting the second subset of the set of data packets to the second node via a third route.

14. The method of claim 13, wherein the first subset of data packets and the second subset of data packets each include one or more information packets.

15. The method of claim 1, wherein at least a portion of the first subset of data packets and the second subset of data packets include corresponding information.

16. The method of claim 1, wherein the change in the mesh network is based at least in part on one or more new connection points, one or more load factors, a signal to noise ratio (SNR), a strength of at least one node, an availability of at least one node, an interference of at least one node, or a combination thereof.

17. A system for wireless communication in a mesh network, comprising:
an apparatus linked to one or more input communication links;
the apparatus linked to output communication links;
a processor;
memory in electronic communication with the processor; and
instructions stored in the memory, the instructions being executable by the processor to:
receive a set of data packets to transmit to a first node and a second node in the mesh network via an input communication link;
assess a characteristic of each of the output communication links;
determine that the characteristic associated with a portion of the identified output communication links between the apparatus and the first node and between the apparatus and the second node satisfies a predetermined threshold value;
identify a transmission path for transmission of the set of data packets based at least in part on the determining, the identified transmission path comprising a first route to the first node and a second route to the second node, wherein the first route includes a first type of connection operating on a first frequency and the second route includes a second type of connection operating on a second frequency;
transmit the set of data packets over the identified transmission path;
detect a change in the mesh network;
adjust the first frequency of the first type of connection based at least in part on the detected change in the mesh network;

determine that the characteristic associated with the first type of connection operating on the adjusted first frequency satisfies the predetermined threshold value; and simultaneously transmit a first subset of the set of data packets from the apparatus to the first node over the first route and a second subset of the set of data packets from the apparatus to the second node over the second route, wherein the first route includes the first type of connection operating on the adjusted first frequency, wherein the second type of connection is different from the first type of connection and the second frequency is different from the adjusted first frequency.

18. The system of claim 17, further comprising a data storage device, and assessing the characteristic of the output communication links comprises referencing stored data linked to the data storage device.

19. A non-transitory computer-readable storage medium storing computer executable instructions that when executed by a processor cause the processor to:

receive, at a first node via an input communication link, a set of data packets to transmit to a second node and a third node in a mesh network;

identify, in response to the receiving, a plurality of output communication links linked to the first node;

assess a characteristic of each output communication link of the identified plurality of output communication links;

determine that the characteristic associated with a portion of the identified output communication links between the first node and the second node and between the first node and the third node satisfies a predetermined threshold value;

identify a transmission path for transmission of the set of data packets based at least in part on the determining, the identified transmission path comprising a first route to the second node and a second route to the third node, wherein the first route includes a first type of connection operating on a first frequency and the second route includes a second type of connection operating on a second frequency;

transmit the set of data packets over the identified transmission path;

detect a change in the mesh network;

adjust the first frequency of the first type of connection based at least in part on the detected change in the mesh network;

determine that the characteristic associated with the first type of connection operating on the adjusted first frequency satisfies the predetermined threshold value; and simultaneously transmit a first subset of the set of data packets from the apparatus to the first node over the first route and a second subset of the set of data packets from the apparatus to the second node over the second route, wherein the first route includes the first type of connection operating on the adjusted first frequency, wherein the second type of connection is different from the first type of connection and the second frequency is different from the adjusted first frequency.

20. The non-transitory computer-readable storage medium of claim 19, wherein assessing the characteristic of each of the output communication links comprises determining whether the characteristic of each of the identified output communication links exceeds the predetermined threshold value.

* * * * *